United States Patent [19]

Suzuki et al.

[11] 4,340,024

[45] Jul. 20, 1982

[54] INTERNAL COMBUSTION ENGINE

[75] Inventors: Suzuo Suzuki, Yokosuka; Yasuhiko Nakagawa, Kamakura; Hisamoto Aihara, Yokohama; Yasuo Matsumoto, Yokohama; Yoji Sato, Yokohama, all of Japan

[73] Assignee: Nissan Motor Company, Limited, Tokyo, Japan

[21] Appl. No.: 48,176

[22] Filed: Jun. 13, 1979

[30] Foreign Application Priority Data

Oct. 13, 1978 [JP] Japan .................... 53/126589

[51] Int. Cl.³ ............................. F02B 33/00
[52] U.S. Cl. ..................... 123/538; 123/536; 123/143 B
[58] Field of Search ............ 123/143 B, 536, 538, 123/297, 298

[56] References Cited

U.S. PATENT DOCUMENTS

| | | | |
|---|---|---|---|
| 3,110,294 | 11/1963 | Nyman | 123/536 |
| 4,041,922 | 8/1977 | Abe | 123/143 B |
| 4,051,826 | 10/1977 | Richards | 123/143 B |
| 4,085,717 | 4/1978 | Willmann | 123/538 |
| 4,124,003 | 11/1978 | Abe | 123/536 |

Primary Examiner—Ronald H. Lazarus
Attorney, Agent, or Firm—Lane, Aitken, Kice & Kananen

[57] ABSTRACT

An internal combustion engine with direct fuel injection is disclosed which comprises at least one combustion chamber fitted with a fuel injection valve. A charging electrode is disposed in the combustion chamber near the fuel injection valve and is supplied with a high DC voltage from a voltage source so as to charge the particles of fuel injected from the injection valve and thereby to disperse them.

11 Claims, 5 Drawing Figures

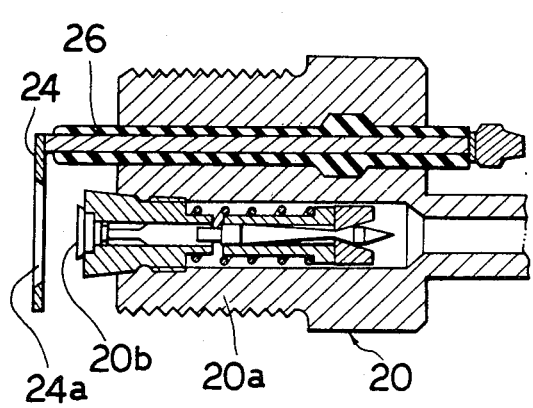
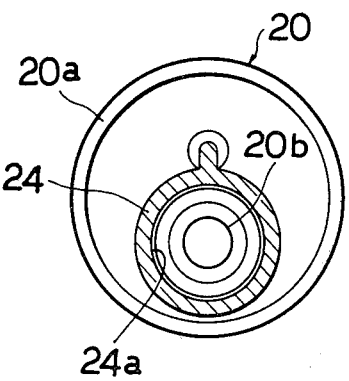
FIG. 3A  FIG. 3B
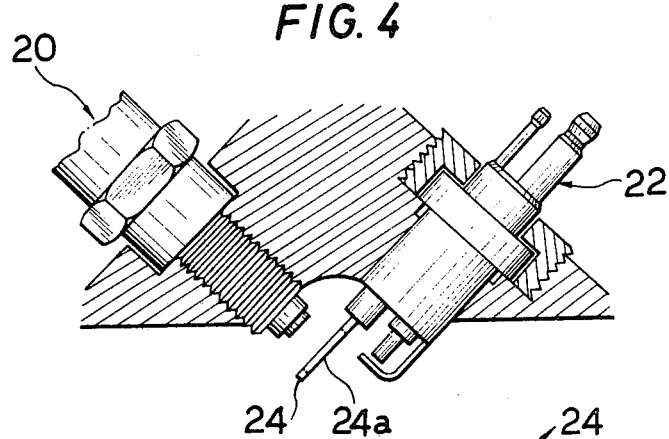
FIG. 4
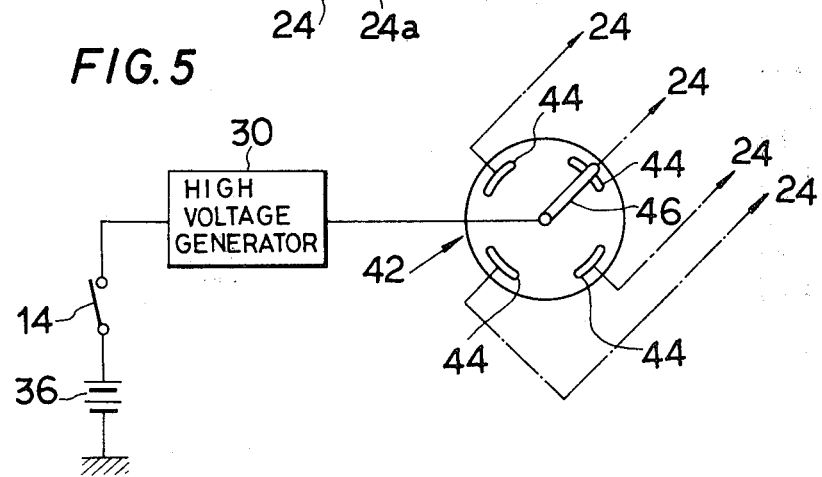
FIG. 5

INTERNAL COMBUSTION ENGINE

BACKGROUND OF THE INVENTION

1. Field of the Invention

This invention relates to improvements in a direct fuel injection type internal combustion engine having at least one combustion chamber fitted with a fuel injection valve for directly injecting fuel into the combustion chamber.

2. Description of the Prior Art

Internal combustion engines of the type having a combustion chamber fitted with a fuel injection valve for injecting fuel directly into the combustion chamber are well known. Such internal combustion engines may be Diesel engines which operate on heavy oil, or gasoline engines which use gasoline fuel. In the case of Diesel engines using heavy oil as a fuel, direct fuel injection is essential, because heavy oil cannot be vaporized or atomized in a conventional carburetor. In the case of gasoline being used as fuel, direct injection is an alternative to the use of a conventional carburetor. In either case, an engine using direct fuel injection has the notable advantage that it can be operated at a very lean air/fuel mixture ratio, such as one higher than 20:1, with a resulting improvement in fuel economy and emission of pollutants.

However, one of the difficulties encountered with such engines is a tendency for localized volumes of rich air/fuel mixture to be produced in the cylinder during fuel injection. As a result, during combustion, proper fuel combustion in these volumes does not occur, due to oxygen starvation, and emission of pollutants in the exhaust, as well as buildup of carbon deposits in the combustion chamber, greatly increases.

SUMMARY OF THE INVENTION

It is therefore one object of the present invention to provide an improved internal combustion engine in which a lean fuel-air mixture may be more effectively maintained without occurrence of rich regions in the combustion chambers.

It is another object of the present invention to provide an internal combustion engine in which adhesion of fuel particles on the sides of the combustion chamber is effectively reduced.

It is another object of the present invention to improve the fuel economy, the performance, and the pollutant characteristics of an internal combustion engine.

Other objects and advantages of the present invention will become apparent to those skilled in the art from a consideration of the following detailed description of exemplary embodiments of the invention.

BRIEF DESCRIPTION OF THE DRAWINGS

The following description of the invention is had in connection with the accompanying drawings, in which like reference characters refer to the same or corresponding parts, and wherein:

FIGS. 3A and 3B are views, one sectional and one end-on, showing an alternative form of the electrode used in a third embodiment of the engine of the present invention, as incorporated in the fuel injection valve thereof;

FIG. 4 is a sectional view showing another form of the electrode used in a fourth embodiment of the engine of the present invention, as incorporated in a sparking plug thereof;

FIG. 5 is a diagram showing a distributor for high voltage as used in an engine of the present invention.

DESCRIPTION OF THE PREFERRED EMBODIMENTS

Figure 1:
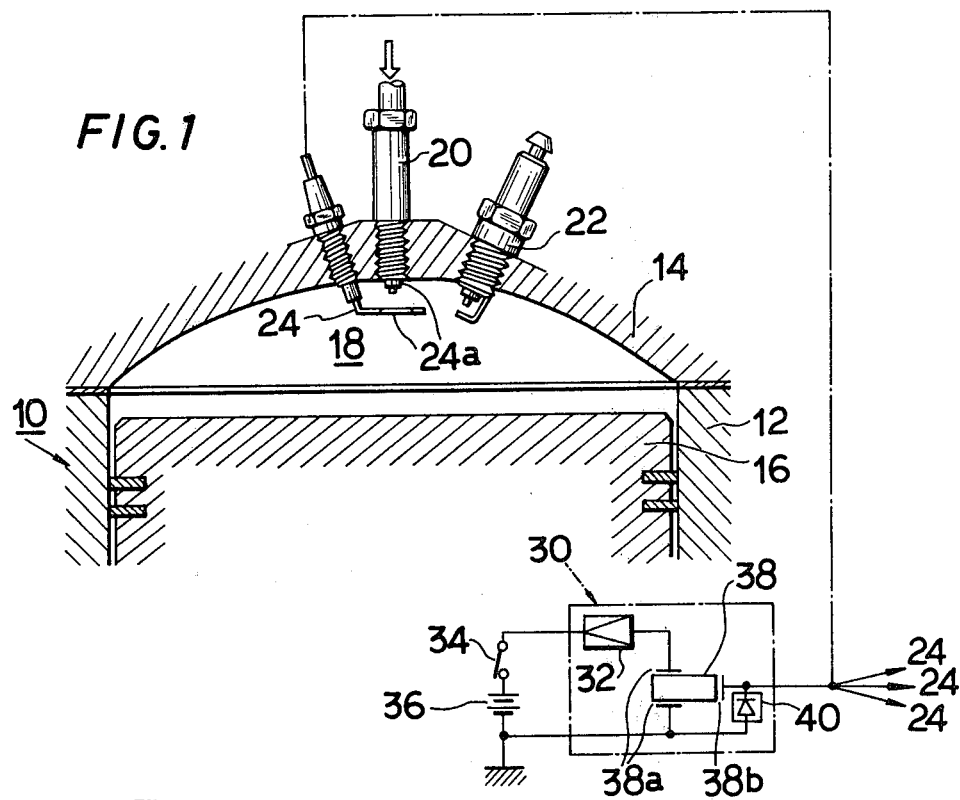
FIG. 1 is a sectional view showing one embodiment of an internal combustion engine of the present invention.
Figure 2:
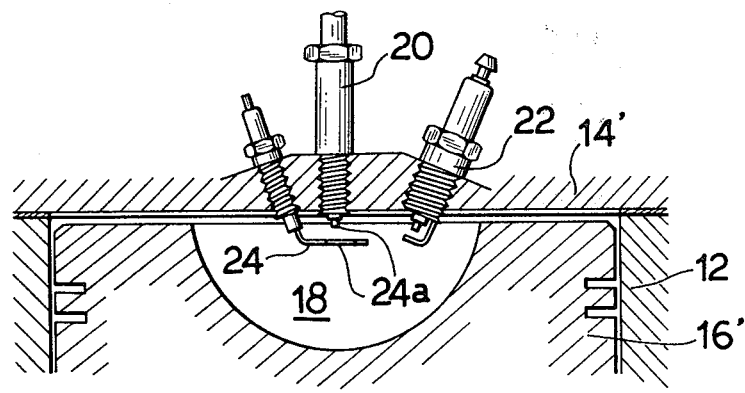
FIG. 2 is a sectional view showing an alternative embodiment of the present invention.

FIG. 1 illustrates the principles of the present invention as applied to a direct injection type internal combustion engine 10. The engine 10 has a cylinder wall 12, a recessed cylinder head 14, and a reciprocating piston 16 for each cylinder, all of which define a combustion chamber 18. The combustion chamber 18 is fitted with a fuel injection valve 20 and an ignition plug 22. It will be understood, of course, that the combustion chamber 18 may be defined by a flat cylinder head 14' and a recessed piston 16' as shown in FIG. 2.

The reference numeral 24 designates a charging electrode formed with a hole 24a and provided in the vicinity of (for example, just below) the fuel injection valve 20 such that fuel particles injected from the fuel injection valve can pass through the hole 24a of the charging electrode 24. The charging electrode 24 is applied with a high voltage from a high voltage generator to be described later for charging the injected fuel particles. Although the charging electrode 24 is shown in FIG. 1 as independently provided, it may be incorporated in the casing 20a of the fuel injection valve 20 through an insulator 26 as shown in FIGS. 3A and 3B. This facilitates attachment of the charging electrode to the cylinder head. For the same purpose, the charging electrode 24 may be incorporated in the ignition plug 22 as shown in FIGS. 4A to 4C. The electrode 24 is formed with a hole 24a so that fuel particles injected from the fuel injection valve 20 can pass through the hole 24a. It is preferable that the ignition plug 22 be provided with positioning pins for engagement with mating positioning holes formed in the cylinder head. This permits the ignition plug 22 to be easily attached to the cylinder head such that the hole 24a of the charging electrode 24 accurately faces the fuel injection nozzle.

The high voltage generator 30 comprises an oscillator 32 receiving a DC voltage through an ignition switch 34 from a battery 36 for providing a voltage of a resonance frequency, a piezo-electric element 38 receiving at 38a the voltage from the oscillator 32 for providing a high voltage at 38b, and a rectifier 40 for rectifying the output voltage of the piezo-electric element 38 into a high DC voltage which in turn is applied to the charging electrode 24. In the illustrated embodiment, the voltage for example, about 10 KV, applied to the charging electrode 24 is positive in polarity with respect to the engine body.

Application of a high DC voltage (positive) to the charging electrode 24 from the high voltage generator 30 will cause a non-uniform electric field and electric field concentration to negatively charge the fuel particles injected from the injection valve 5. As a result, electric repulsion occurs among the charged fuel particles to divide the injected fuel particles into more fine particles of uniform size, resulting in uniform fuel injection. The negatively charged fuel particles in the vicinity of the combustion chamber walls are moved toward the charging electrode 24 under electric forces resulting from a high electric field produced between the charging electrode (positive) and the combustion chamber walls (negative) so that they can hardly adhere on the combustion chamber walls.

Application of a high voltage to the charging electrode 24 is effected continuously during engine operation in the above embodiment, but is required only during fuel injection. FIG. 5 illustrates a distributor 42 interposed between the charging electrode 24 for each cylinder and the high voltage generator 30 for applying a high voltage to the charging electrode 24 in synchronism with fuel injection of the cylinder. The distributor 42 comprises segments 44 connected to the respective charging electrodes 24, and a rotor 46 rotatable in synchronism with rotation of the drive shaft of an fuel injection pump (not shown) to come into sliding contact with each segment 44 for a certain length of time so that a high voltage can be applied from the high voltage generator 30 to the corresponding charging electrode 24 through the connection of the rotor 46 and the segment 44 during fuel injection of the corresponding cylinder. Thus, the time and the length of time of application of the high voltage to each charging electrode is synchronized with the time and the length of time of fuel injection of the corresponding cylinder.

The above described internal combustion engine of the present invention provides the following distinct advantages: First, the fuel particles injected from the fuel injection valve are charged in the same polarity for better fuel particle miniaturization and for more uniform fuel injection. Second, the fuel particles can hardly adhere on the combustion chamber walls, the fuel injection valve, and the ignition plug under electric repulsion among the charged fuel particles resulting from a high electric field produced between the charging electrode and these components. Third, more complete fuel combustion can be accomplished in the combustion chamber to reduce the amount of carbon and unburned hydrocarbons emitted to the atmosphere and adhering on the fuel injection valve for the first and second reasons, with a resulting higher fuel injection performance.

While this invention has been particularly shown and described with reference to preferred embodiments thereof, it will be understood by those skilled in the art that the foregoing and other changes in form and details may be made therein without departing from the spirit and scope of the invention.

We claim:

1. A direct injection type internal combustion engine including at least one combustion chamber fitted with a fuel injection valve for directly injecting fuel into the combustion chamber, the engine comprising a charging electrode disposed near the fuel injection valve within the combustion chamber, and a high voltage source for applying a high DC voltage to the charging electrode to charge the fuel injected from the injection valve, said electrode and said high voltage source comprising means to charge the fuel with a polarity which is the opposite of said high DC voltage applied to said charging electrode.

2. An internal combustion engine as set forth in claim 1, wherein the charging electrode is incorporated in the fuel injection valve.

3. An internal combustion engine as set forth in claim 1, wherein the high voltage source comprises an oscillator receiving a DC voltage for providing a voltage of a resonance frequency, a piezo-electric element receiving the resonance voltage from the oscillator for providing a high voltage, and a rectifier for rectifying the high voltage from the piezo-electric element into a high DC voltage.

4. An internal combustion engine including at least one combustion chamber fitted with an ignition plug and a fuel injection valve for directly injecting fuel into the combustion chamber, the engine comprising a charging electrode incorporated in the ignition plug and extending near the fuel injection valve within the combustion chamber, and a high voltage source for applying a high DC voltage to the charging electrode to charge the fuel injected from the injection valve, said electrode and said high voltage source comprising means to charge the fuel with a polarity which is the opposite of said high DC voltage applied to said charging electrode.

5. An internal combustion engine as set forth in claim 4, wherein the ignition plug is provided with positioning pins for engagement with mating positioning holes formed in the cylinder head such that the electrode can directly face the direction of travel of the injected fuel after installation.

6. A direct injection type internal combustion engine including a plurality of combustion chambers each fitted with a fuel injection valve for directly injecting fuel into the combustion chamber, the engine comprising a high voltage source, a charging electrode disposed near the fuel injection valve within each combustion chamber, and a distributor having segments connected to the respective charging electrodes and a rotor connected to the high voltage source and rotatable into sliding contact with each segment in synchronism with fuel injection into the corresponding combustion chamber for applying a high voltage from the high voltage source to the corresponding charging electrode to thereby charge the fuel injected from the injection valve only during the fuel injection, said distributor and said charging electrode comprising means to charge the fuel with a polarity which is the opposite of said high DC voltage applied to said charging electrode.

7. An internal combustion engine as recited in any one of claims 1, 4 or 6 wherein said charging electrode and said high voltage source comprise means to apply a high voltage field between said charging electrode and said fuel injection valve arranged so that said fuel is charged upon entering said combustion chamber.

8. An internal combustion engine as recited in claim 7, wherein said charging electrode defines an aperture axially aligned with the direction of fuel injection through said fuel injection valve and said electrode is positioned for said injected fuel to pass through said aperture.

9. An internal combustion engine as recited in any one of claims 1, 4, and 6 wherein said high voltage electrode projects into said combustion chamber to define a gap within said combustion chamber between said electrode and said fuel injection valve, said electrode and said high voltage source comprising means to apply a high voltage field between said electrode and said fuel injection valve across said gap.

10. An internal combustion engine as recited in claim 9 wherein said charging electrode defines an aperture axially aligned with the direction of fuel injection through said fuel injection valve.

11. An internal combustion engine according to claim 1 wherein said high voltage source has its positive terminal connected to said charging electrode to make said charging electrode positive with respect to the walls of said combustion chamber.

* * * * *